United States Patent
Connors

(12) 
(10) Patent No.: US 8,636,457 B2
(45) Date of Patent: Jan. 28, 2014

(54) TWO-WAY FASTENER

(75) Inventor: Robert W. Connors, Lake Barrington, IL (US)

(73) Assignee: Robert W. Connors, Lake Barrington, IL (US)

( * ) Notice: Subject to any disclaimer, the term of this patent is extended or adjusted under 35 U.S.C. 154(b) by 490 days.

(21) Appl. No.: 12/822,780

(22) Filed: Jun. 24, 2010

(65) Prior Publication Data

US 2010/0329817 A1    Dec. 30, 2010

Related U.S. Application Data

(60) Provisional application No. 61/220,395, filed on Jun. 25, 2009.

(51) Int. Cl.
   *F16B 15/00*    (2006.01)
(52) U.S. Cl.
   USPC .......................................... 411/388; 411/458
(58) Field of Classification Search
   USPC .......... 411/388, 458, 473, 480, 481, 488, 491
   See application file for complete search history.

(56) References Cited

U.S. PATENT DOCUMENTS

| | | | |
|---|---|---|---|
| 309,817 A | | 12/1884 | Bartow |
| 321,389 A | * | 6/1885 | Schirmer ........................ 411/389 |
| 346,148 A | * | 7/1886 | Durham ......................... 411/388 |
| 722,046 A | | 3/1903 | Rieger |
| 736,121 A | * | 8/1903 | Lipscomb ....................... 36/67 C |
| 817,090 A | * | 4/1906 | Pfeiffer .......................... 36/67 C |
| 824,983 A | | 7/1906 | Farrington |
| 1,036,229 A | | 8/1912 | Harrild |
| 1,150,358 A | | 8/1915 | Gilmer |
| 1,907,495 A | | 5/1933 | Brunski |
| 5,059,077 A | * | 10/1991 | Schmid ........................... 411/400 |
| 5,154,610 A | * | 10/1992 | Gregorio Gracia .............. 433/74 |
| 6,033,170 A | | 3/2000 | Gold |
| 6,102,642 A | * | 8/2000 | Kawashita et al. ............. 411/401 |
| 6,679,668 B2 | * | 1/2004 | Martin et al. .................. 411/388 |
| 2010/0061825 A1 | * | 3/2010 | Liu et al. ....................... 411/388 |

\* cited by examiner

*Primary Examiner* — Gary Estremsky
(74) *Attorney, Agent, or Firm* — Robert W. Connors

(57) ABSTRACT

A two-way fastener includes a first member configured to be attached to a first workpiece via a tool selected from the group consisting of: a pair of pliers, a screwdriver, a nutdriver and a hammer; and a second member configured to be attached to a second workpiece such that the second workpiece comes together with the first workpiece and at least substantially hides the entire two-way fastener, the second member extending in an opposite direction as the first member.

10 Claims, 5 Drawing Sheets

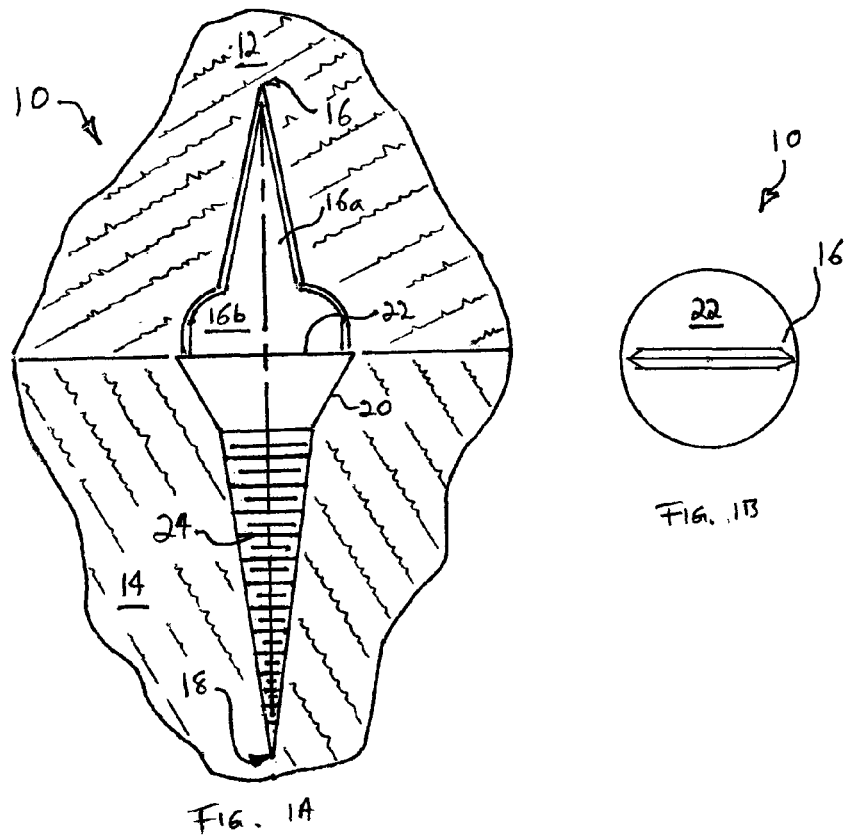
FIG. 1A
FIG. 1B
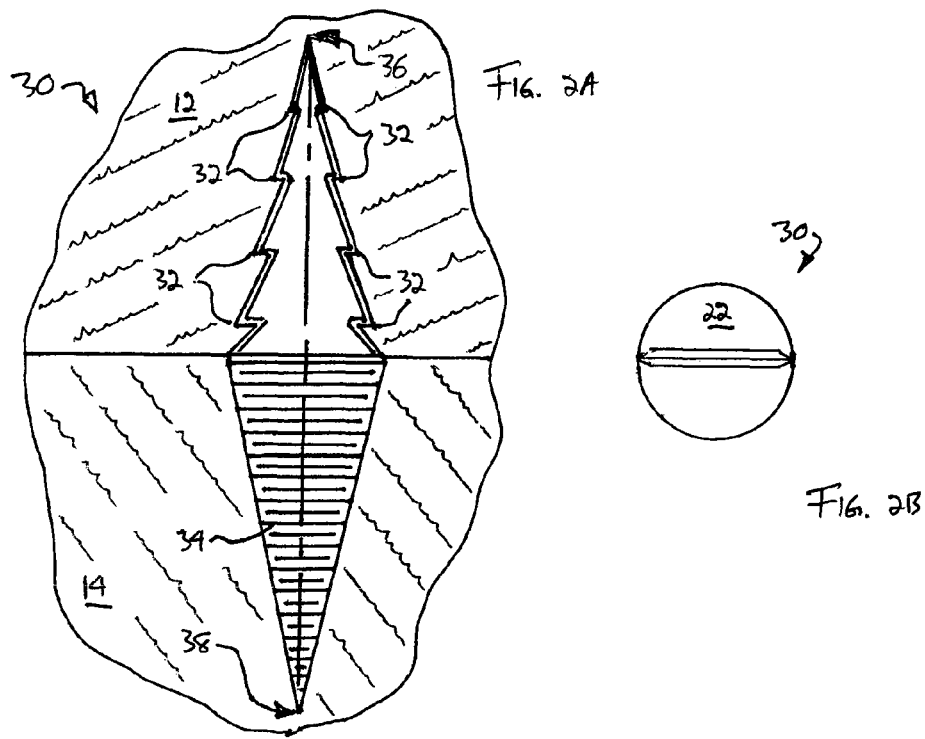
FIG. 2A
FIG. 2B

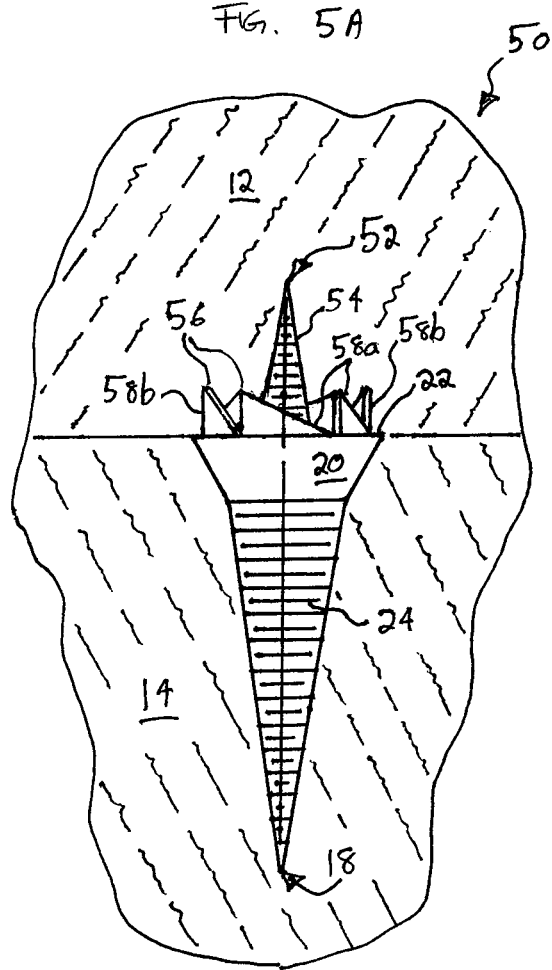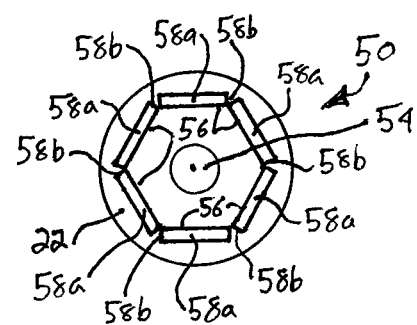

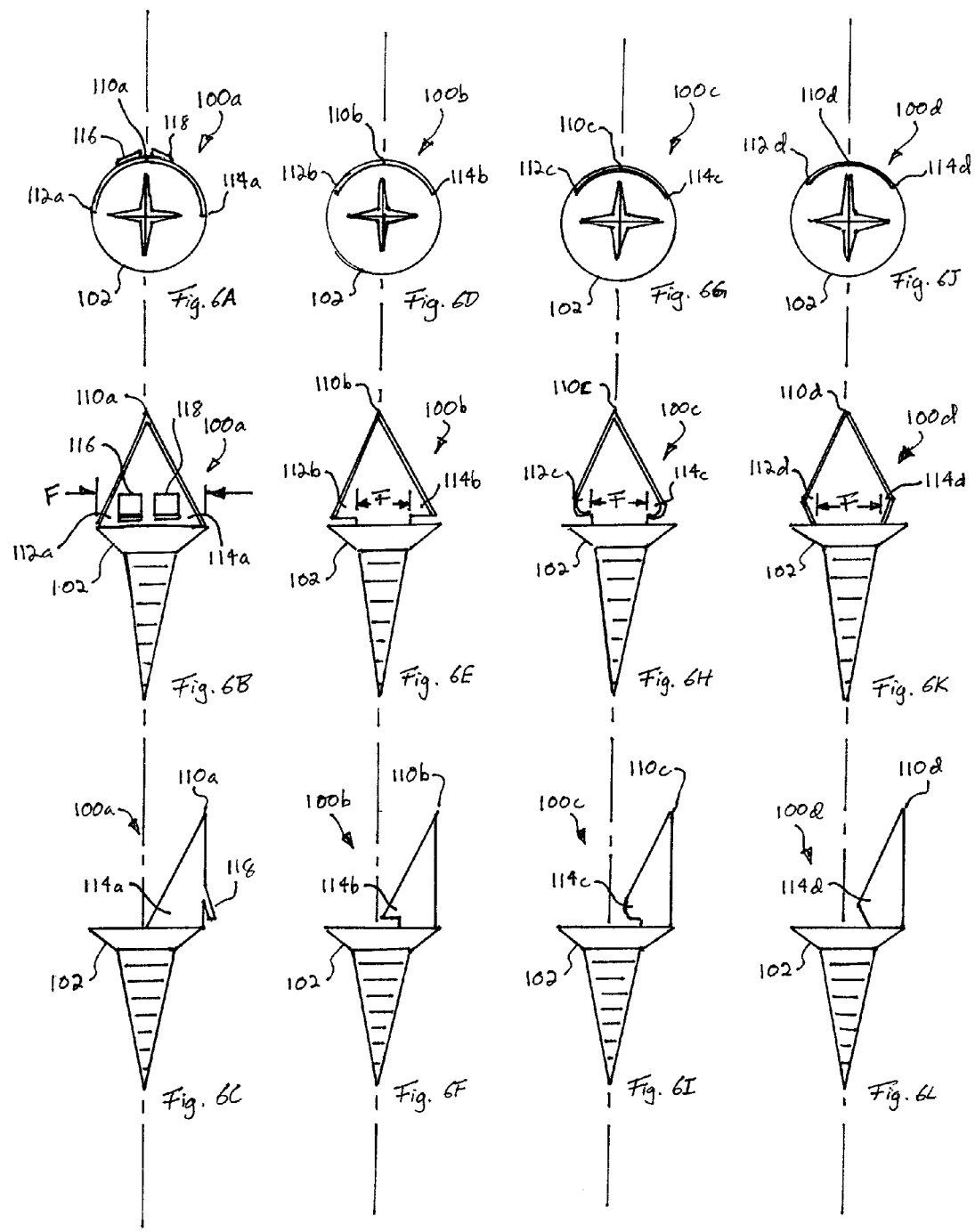

TWO-WAY FASTENER

PRIORITY CLAIM

This application claims priority to and the benefit of U.S. provisional patent Application No. 61/220,395, entitled "Two-Way Fastener", filed Jun. 25, 2009, the entire contents of which are incorporated herein by reference and relied upon.

BACKGROUND

The present disclosure relates to fasteners.

A leg in the table of my living room came loose. The leg at its center had a bore. An internally threaded collar had been press-fitted into the bore. The bore size had been widened such that the collar no longer press-fit into the bore. Attempts to recreate a press-fit were unfruitful, including wrapping the collar with tape and attempting to press the tape-expanded collar into the bore. Attempts to glue the collar into the bore were likewise unsuccessful. Attempts to glue the leg directly to the table were likewise unsuccessful. In each case, the leg continued to wobble. A different type of mechanical fastener was needed.

I was reluctant to bolt the leg from outside the leg to the table top because the screw or nail heads would be viewable on a fairly nice piece of furniture in a fairly nice room of the house. I attempted to find a double-ended fastener that would allow the leg to be re-bolted to the table without being viewable once the leg had been reattached but could find none.

In the end, I re-bolted the leg from the outside, choosing stability over aesthetics. The repair process however led me to conceive of the two-way fastener discussed below.

A patent search revealed U.S. Pat. No. 6,679,668, entitled Double-Ended Fastener. This patent however has the drawback of requiring a separate installation tool 110, 210, 310, 403 and 405 for each of its embodiments of FIGS. 1, 2, 3, 4A and 4B, respectively (see also Claim 1). The drawbacks of a separate, specialized installation tool should be obvious to those of skill in the art. If the tool is lost, broken or forgotten, the fasteners are rendered useless until a new tool is obtained.

A need accordingly exists for an improved two-way fastener.

SUMMARY

The present disclosure sets forth an improved two-way fastener. The fastener allows for a first workpiece to be fixed mechanically to a second workpiece, after which the fastener is hidden from view by the workpieces. The fasteners are ideal for furniture building, for example, because they offer a strong but aesthetically pleasing connection of two workpieces.

Each of the embodiments illustrated below shows a two-way fastener that is secured to a first workpiece using a standard hardware utensil, such as pair of pliers, a screwdriver, a nut driver or a socket. The second workpiece is then bolted to the first workpiece, for example by driving or translating the second workpiece onto a nail section of the fastener, which extends outward from the first workpiece. In the broken table leg example illustrated in the BACKGROUND, the two-way fastener can be screwed into a bottom of the table top using for example a standard pair of pliers or a screwdriver, leaving a nail member of the fastener extending out from the bottom surface of the tabletop. Next, the table leg is driven onto the nail member of the fastener, reattaching the leg to the table top and at the same time hiding the two-way fastener from view. In an alternative fastener shown below, the secondary fastener extending from the bottom of the table top is a threaded fastener onto which the table leg is threaded to yield the hidden connection.

In one embodiment, therefore, the fastener includes a screw member and a nail member. The screw member can be in the form similar to a flathead screw, such that the screw portion threaded into the workpiece becomes flush with the insertion surface of the workpiece. The nail member can have a same central axis as the screw member and extend in an opposite direction as the screw member. The nail member can be in the form of a standard nail having a cylindrical extension terminating in a pointed tip. The nail member alternatively (i) is flattened and/or (ii) has one or more saw-tooth edge that aids in preventing the workpieces from being pulled apart axially.

The base of the nail member of the fastener includes a flattened area that is configured to receive a head of a standard pair of pliers. A user applies the pliers to the flattened area to grasp and turn the two-way fastener. The user presses the pliers axially against the top of the flathead of the screw member to drive the fastener into the workpiece as the user turns the pliers. In this manner, the fastener is threaded into the workpiece. The workpiece can be of a softer material, such as wood, such that the driving force required by the user is reasonably small. A suitable pilot hole can be drilled if necessary.

In a second embodiment, the top of the flathead of the screw portion is expanded, such that one or more nail member can be located off-center from the screw member. That is, the one or more nail member has a central axis that is not coextensive with, but perhaps parallel to, a central axis of the screw portion of the two-way fastener. The nail member can again be straight-shafted, saw-toothed or serrated as desired. The top surface of the flathead of the screw member defines a female recess configured to receive the tip of a screwdriver, such as a Phillips head or slotted head screwdriver. The user inserts the head of a screwdriver into the recess, e.g., between two or more nail members, and screws the threaded portion of the two-way fastener into the workpiece. The user then drives a second workpiece onto the one or more nail member to secure the two workpieces together mechanically.

In a further alternative embodiment, the two-way fastener is a two-way screw, which may be desirable for certain applications. One end has a first flathead screw member as described above. The head of the flathead end of the first screw member has a raised hexagon ridge sized to receive a standard hex head socket or nutdriver. The hexagon ridge is raised in a same direction as is a second screw member that extends from the center of the hex head, in an opposite direction as the first screw member. Each of the six sides of the raised hexagon ridge is formed having a saw-tooth shape. The teeth are oriented so as to cut into a second workpiece as the second workpiece is nearing the first workpiece when it is threaded onto the second screw member, which occurs after the first screw member is screwed into the first workpiece.

The head of the flathead end of the first screw member extends past (has a larger diameter than) the raised hexagon ridge, so that the user can press the socket or nutdriver against the outer edge of the top surface of the flathead, as the user turns the socket or nutdriver against the raised hexagon ridge, to drive the first screw member into the first workpiece. The second screw member has a length and thickness sized to fit inside of the socket or nutdriver head. The saw-teeth sides of the ridge can be configured to bend as they cut into the second workpiece, e.g., as it is threaded in a clockwise direction onto the second screw member and the first workpiece, so as to create a locked-fit with the second workpiece. Or, the saw-teeth sides can be configured to create gouges in the second workpiece as the second workpiece is rotated onto the second screw member.

In a different version of this third embodiment, the angled flathead portion of the first workpiece is replaced with a second set of saw-teeth that also bend (or create gouges in the wood) as the first screw member is threaded into the first workpiece, so as to create a locked-fit between the first screw member and the first workpiece.

In a forth embodiment, a blade extends from a self-threading screw. In an embodiment, the blade extends around at least part of the head of the screw so as to expose the screw's slots to allow for turning the screw into a first workpiece using a standard screwdriver. The blade comes to a point for piercing into and connecting the second workpiece to the first workpiece. The blade can have a generally triangular shape that is rolled or formed to have a diameter matching that of the head of the screw. That is, the base of the triangle is arched to have a diameter matching that of the head of the screw. The opposing tip of the triangle is sharpened for piercing the second workpiece. The rounded blade provides a secondary advantage in that it helps to stabilize the fastener on the screwdriver while transporting the fastener to the first workpiece.

In one implementation, the entire base of the triangle is connected to the head of the screw. This configuration provides a robust blade that will resist bending as it pierces into the second workpiece. It is contemplated for this and other implementations to cut or form tabs in the blade for creating stress against the second workpiece when inserted into same to help hold or lock the second workpiece to the blades and fastener and thus help lock the first and second workpieces together.

In another implementation, only a portion, e.g., central portion, of the base is connected (e.g., formed with or welded to) to head of the screw, leaving ears or tabs of the blade extending free from the connected portion of the base. The ears or tabs, it is thought, will tend to flex or bend as the blade portion of the fastener is inserted into the second workpiece, which will tend to create stress on the ears or tabs, which will in turn impart stress onto the second workpiece when inserted into same to help hold or lock the second workpiece to the blades and fastener and thus help lock the first and second workpieces together.

It is accordingly an advantage of the present disclosure to provide an improved two-way fastener.

It is another advantage of the present disclosure to provide a mechanical fastener that can mechanically link two workpieces and be hidden by the workpieces.

It is a further advantage of the present disclosure to provide a fastener having a first member that is screwed into a first workpiece, and which allows a second workpiece to be translated onto a second member of the fastener.

It is still a further advantage of the present disclosure to provide a fastener having a first member that is screwed into a first workpiece, and which allows a second workpiece to be screwed onto a second member of the fastener.

It is yet another advantage of the present disclosure to provide a fastener having flanged edges that bend to lock the fastener into a workpiece or create gouges in the workpiece to form a tensioned fit.

Still another advantage of the present disclosure is to provide a two-way fastener that tends to be self-locking.

Still a further advantage of the present disclosure is to provide a two-way fastener that tends hold itself onto the associated tool for transportation of the fastener to the workpiece for connection.

Further still, it is an advantage of the present disclosure to provide a two-way fastener that is fixable to a workpiece via a conventional tool, such as a screwdriver, pliers, nutdriver, socket or hammer.

Additional features and advantages are described herein, and will be apparent from the following Detailed Description and the figures.

BRIEF DESCRIPTION OF THE FIGURES

FIGS. 1A and 1B are elevation and top views, respectively, of one embodiment of a two-way fastener of the present disclosure having a screw member and a nail member for operation with a standard pair of pliers or vice grip tool and hammer.

FIGS. 2A and 2B are elevation and top views, respectively, of a second embodiment of a two-way fastener of the present disclosure having a screw member and a nail member for operation with a standard pair of pliers or vice grip tool and hammer.

FIGS. 5A and 5B are elevation and top views, respectively, of a fifth embodiment of a two-way fastener of the present disclosure having dual screw members for operation with a standard nutdriver or socket.

FIGS. 6A to 6L are top, front and side elevation and views of a sixth embodiment of a two-way fastener of the present disclosure having a screw member for operation with a standard screwdriver and a nail member or blade.

DETAILED DESCRIPTION

Figure 3A:
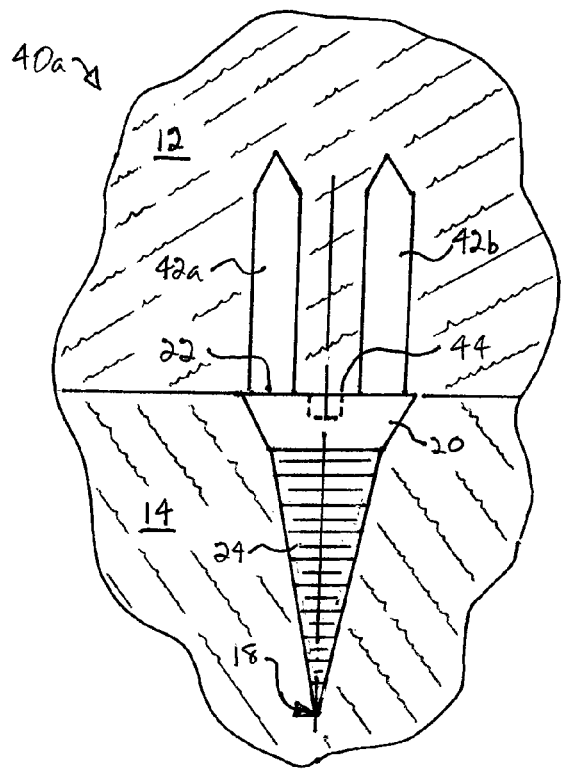
FIGS. 3A and 3B are elevation and top views, respectively, of a third embodiment of a two-way fastener of the present disclosure having a screw member and a nail member, having at least one nail, for operation with a standard flathead screwdriver and hammer.

Referring now to the drawings and in particular to FIGS. 1A and 1B, fastener 10 illustrates one embodiment of a two-way fastener of the present disclosure. Fastener 10 (as well as any of the fasteners described herein) is made of a suitable material, such as steel, stainless steel, a galvanized metal, copper, bronze, aluminum and alloys thereof. Fastener 10 (as well as any of the fasteners described herein) can be cast, machined, or made via powdered metal as desired. For softer workpieces, it is contemplated to mold fastener 10 (and others) into a plastic piece.

Figure 8:
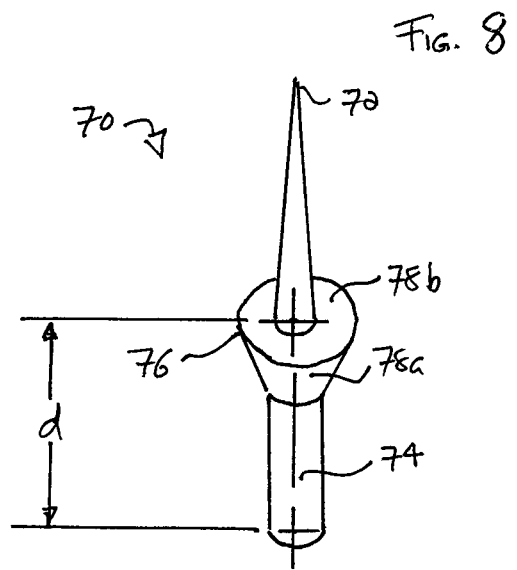
FIG. 8 is a perspective view of an alternative cylindrical nail having a standoff for securely separating the attached workpieces by a desired distance or gap.

Fastener 10 connects first workpiece (e.g., wood) 12 to second workpiece (e.g., wood) 14, such that workpieces 12 and 14 can be mounted flush against each other. If desired, upper nail member 16 can be provided with, e.g., gusseted, tabs (not illustrated) extending ninety degrees from one or more of the flat surfaces of nail member 16 (into and/or out of the page), and having an upper surface that is spaced from a top surface 22 of flathead portion 20 of screw member 18 a desired distance, e.g., 0.5 inch (12.7 mm), so as to (i) connect workpieces 12 and 14 together and (ii) space workpieces 12 and 14 apart the desired distance or gap. FIG. 8 shows a cylindrical nail 70 having cylindrical standoff 76 for performing the same function.

In the illustrated embodiment, nail member 16 has a same central axis as screw member 18 and extends in an opposite direction from surface 22 than does screw member 18. As illustrated below, nail member 16 (or multiple nail members) can be offset from the central axis of screw member 18.

In one embodiment, screw member 18 of fastener 10 is screwed or threaded first into workpiece 14, after which (i) workpiece 12 is hammered onto nail member 16 or (ii) workpiece 14, with nail member 16 extending from it, is hammered onto workpiece 12. Screw member 18 is in one preferred embodiment self-threading.

Nail member 16 includes an upper spike portion 16a and a lower flange portion 16b. The outer edges of spike portion 16a and lower flange portion 16b can be chamfered as illustrated to provide a sharp edge to nail member 16 if desired to help nail member 16 to pierce and extend into workpiece 12. It is contemplated to use a standard pair of pliers or vice-grip tool to grab lower flange portion 16b, and with a tip of the tool pressed against surface 22, turn and drive tapered threaded (self-threading) portion 24 into workpiece 14. Nail member 16, and in particular lower flange portion 16b, has a thickness sufficient to withstand the torque imparted by the user's tool.

Referring now to FIGS. 2A and 2B, fastener 30 illustrates a second embodiment of a two-way fastener of the present disclosure. Fastener 30 includes many of the same components and features as fastener 10 and like components are numbered the same. Here, though, nail member 16 of fastener 10 is replaced with alternative nail member 36. Alternative nail member 36 does not have a separate flange portion like nail member 16. Instead, the saw-tooth edges 32 of nail member 36 (which can also be chamfered to form sharper edges as illustrated) extend all the way to surface 22. The saw-tooth edges 32 of nail member 36 help to lock workpiece 12 onto nail member 36 and thus fastener 30, securing workpieces 12 and 14 together. Nail member 36 has a thickness sufficient to withstand the torque imparted by the user's tool.

Also, screw member 38 is modified so as not to have flathead portion 20, such that the tapered threaded portion 34 extends all the way to surface 22. Alternative screw member 38 could be used with fastener 10 instead of screw member 18. Alternative nail member 36 could be used with fastener 10 instead of nail member 16.

Figure 3B:
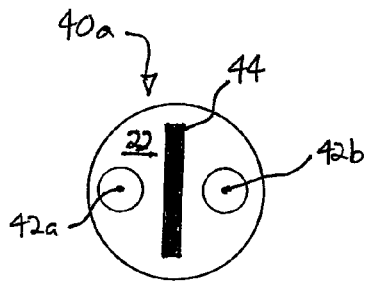

Referring now to FIGS. 3A and 3B, fastener 40a sets forth a third embodiment of a two-way fastener of the present disclosure. Fastener 40a includes many of the same components and features as the above fasteners, and like components are numbered the same. Here, though, the nail member includes two nails 42a and 42b, which are positioned equidistant from and about a flathead screw slot 44. The user inserts the head of a standard flathead screwdriver into slot 44 to turn and drive tapered threaded portion 24 of screw member 18 into workpiece 14, after which (i) workpiece 12 is hammered onto nails 42a and 42b or (ii) workpiece 14, with nails 42a and 42b extending from it, is hammered onto workpiece 12.

Figure 4A:
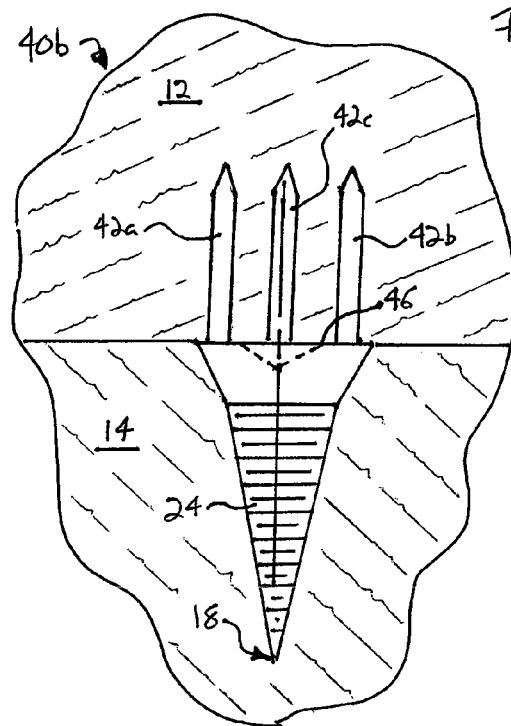
FIGS. 4A and 4B are elevation and top views, respectively, of a fourth embodiment of a two-way fastener of the present disclosure having a screw member and a nail member, having at least one nail, for operation with a standard Phillips head screwdriver and hammer.
Figure 4B:
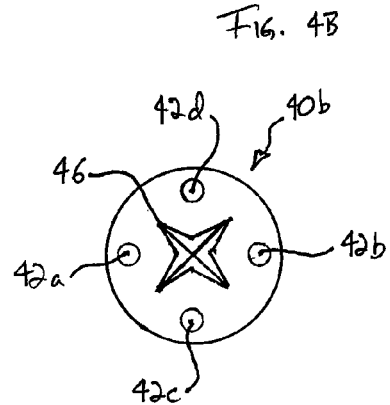

Referring now to FIGS. 4A and 4B, fastener 40b sets forth a fourth embodiment of a two-way fastener of the present disclosure. Here, the nail member includes four nails 42a to 42d, which are positioned equidistant from and about a Phillips head screw slot 46. The user inserts the head of a standard Phillips head screwdriver into slot 46 to turn and drive tapered threaded portion 24 of screw member 18 into workpiece 14, after which (i) workpiece 12 is hammered onto nails 42a to 42d or (ii) workpiece 14, with nails 42a to 42d extending from it, is hammered onto workpiece 12.

Fastener 40b can have less than four nails. Nails 42a and 42b of fastener 40a and nails 42a to 42d of fastener 40b are alternatively flat and/or have saw-teeth taught above. Nails 42a and 42b of fastener 40a and nails 42a to 42d of fastener 40b are alternatively cylindrical spikes. Fasteners 40a and 40b can further alternatively employ screw member 38 of fastener 30.

Referring now to FIGS. 5A and 5B, fastener 50 illustrates a dual screw member arrangement for operation with a standard nutdriver or socket. Fastener 50 includes many of the same components and features as the above fasteners, and like components are numbered the same. Fastener 50 is shown with lower screw member 18 but could use lower screw member 38 of fastener 30 alternatively.

Fastener 50 includes an upper screw member 52 (e.g., self-threading) for threading into upper workpiece 12. Also, fastener 50 provides triangular walls 56 that collectively form a hexagon that is sized to receive a standard English or metric nutdriver or socket. Upper screw member 52 is sized to fit inside the head of the nutdriver or socket as the nutdriver or socket is fitted over triangular walls 56 and pressed against the outer ring of surface 22 to allow the user to drive and screw fastener 50 into lower workpiece 14.

As illustrated, triangular walls 56 are provided as a series of saw-teeth, each wall 56 having an angular edge 58a and a vertical edge 58b. In the illustrated embodiment, in which upper screw member 52 is a right-handed screw, angular edge 58a is positioned with respect to a vertical edge 58b such that angular cutting edge 58a contacts the lower surface of upper workpiece 12 as the upper workpiece is threaded down onto screw member 52. Cutting edges 58a cut into the lower surface of upper workpiece 12 as the workpiece is threaded the final distance towards surface 22 of flathead portion 20. Triangular walls 56 will attempt to maintain their hexagon forming structure as workpiece 12 is rotated in a circular manner onto hexagon forming walls 56. The result is (i) a bending of walls 56; (ii) an irregular gouge formed in workpiece 12; and (iii) a combination of (i) and (ii). It is contemplated that regardless of which result occurs, the slicing of walls 56 into workpiece 12 will form a self-locking connection of workpiece 12 to workpiece 14.

The edges (one or both of edges 58a and 58b) of walls 56 may be chamfered as shown above in FIGS. 1A and 2A to provide sharp cutting edges that may tend to form the irregular gouge in workpiece 12 discussed at (ii) above. Or, walls 56 may be formed taller and thinner so that they are more likely to bend as discussed at (i) above. It is contemplated to orient walls 56 oppositely, so that workpiece 12 threads first into vertical edge 58b as opposed to angled edge 58a. Still further alternatively, both edges 58a and 58b can be angled so as to meet at an apex located for example at the center of wall 56.

In yet another alternative embodiment, upper threaded member 52 is replaced via any of the nail portions or nails described herein. Here, upper workpiece 12 is translated or hammered onto walls 56 as opposed to being threaded onto the walls. Again, the edges of walls 56 may be chamfered and have any of the shapes and orientations described above.

In still another alternative embodiment, flathead portion 20 of the upper screw member 52 is replaced with a second set of downward facing saw-teeth that also bend (or create gouges in the wood) as the screw member 18 is threaded into workpiece 14, so as to create a locked-fit between the screw member 18 and first workpiece 14.

In yet a further alternative embodiment (not illustrated), screw member 38 having threaded portion 34 is used (FIG. 2A), and surface 22 is extended radially outwardly past the top of threaded portion 34. Here, a second set of walls 56 are provided at the edge of surface 22 to form a polygon, like above, or to form a circler shape, and in either case extend downward from surface 22. The downward facing walls 56: (i) bend, (ii) gouge or (i and ii) both to lock into workpiece 14 in a manner described above.

Referring now to FIGS. 6A to 6L, fasteners 100a to 100d illustrate multiple examples of a screw-to-translate embodiment of the two-way fastener of the present disclosure. FIGS. 6A to 6C show top, front and side elevation views, respectively, of fastener 100a. FIGS. 6D to 6F show top, front and side elevation views, respectively, of fastener 100b. FIGS. 6G to 6I show top, front and side elevation views, respectively, of fastener 100c. FIGS. 6J to 6L show top, front and side elevation views, respectively, of fastener 100d. Fasteners 100a to 100d can be made of any of the materials listed herein. Each of the fasteners 100a to 100d is illustrated having a self-threading Phillips head type screw portion 102 but can alternatively have any type of slotted screw head. In one preferred embodiment, the head of the screw portion, as is the case with screw portion 102 is of a flathead type, although panhead and other types of heads may be provided instead.

Fastener 100a of FIGS. 6A to 6C includes a blade 110a that has a rolled-triangular shape. The sides of blade 110a (and any of the blades of fasteners 100a to 100d) can be generally straight as illustrated or be bowed outwardly or inwardly as desired. The sides of blade 110a (and any of the blades of fasteners 100a to 100d) can also be chamfered or sharpened along inner, outer or both edges of the sides of the blade as desired for insertion into the second workpiece. Blade 110a is formed with or welded to screw portion 102. The entire base of blade 110a is fixed to (e.g., formed with or welded to) the head of screw member 102. That is, the circumferential fixed length F shown in FIG. 6B will be equal to the circumferential length of the base of blade 110a. Blade 110a including its corners 112a and 112b will accordingly resist bending or deforming as it is inserted into the second workpiece and provide a rigid fastener.

If needed for any of fasteners 100a to 100d, locking tabs 116 and 118 may be provided to help lock blade 110a to the second workpiece after insertion. In the illustrated embodiment, locking tabs 116 and 118 are formed by cutting the tabs along three sides in the wall of blade 110a and then bending the tabs outward about the remaining hinge-like tops of the tabs. Here, locking tabs 116 and 118 will tend to be bent inward upon insertion of blade 110a into the second workpiece, causing tabs 116 and 118 to provide a counteracting locking force or stress against the gouged-out inner wall of the second workpiece. The force acts as a locking force to hold the second workpiece onto blade 110a and consequently to hold the second workpiece fixed to the first workpiece. While two locking tabs 116 and 118 are shown, only a single or three or more locking tabs may be provided and juxtaposed radially as shown, axially, diagonally, or some combination thereof. Locking tabs 116 and 118 may also be formed with, e.g., extend from blade 110a, as opposed to being cut and bent from blade 110a.

Fastener 100b of FIGS. 6D to 6F also includes a blade 110b that has a rolled shape, here a triangular, tree shape. Blade 110b is formed with or welded to screw portion 102. Here, less that the entire base of blade 110b is fixed to (e.g., formed with or welded to) the head of screw member 102. That is, the circumferential fixed length F shown in FIG. 6E is less than the largest circumferential length of the bottom of blade 110b. Blade 110b forms ears or tabs 112b and 114b, here sharp-triangular shaped, that will tend to be bent or deformed upon insertion of blade 110b into the second workpiece causing ears or tabs 112b and 114b to provide a counteracting locking force or stress against the gouged-out inner wall of the second workpiece. The force acts as a locking force to hold the second workpiece onto blade 110b and consequently to hold the second workpiece fixed to the first workpiece. Circumferential fixed length F is chosen to provide a desired combination of (i) rigidity to blade 110b for ease of insertion into the second workpiece and (ii) flexibility to blade 110b for locking blade 110b and fastener 100b to the second workpiece once inserted into same.

Fastener 100c of FIGS. 6G to 6I also includes a blade 110c that has a rolled shape, here a spade-like shape. Blade 110c is formed with or welded to screw portion 102. Here again, less that the entire base of blade 110c is fixed to (e.g., formed with or welded to) the head of screw member 102. The circumferential fixed length F shown in FIG. 6H is less than the largest circumferential length of the bottom of blade 110c. Blade 110c forms ears or tabs 112c and 114c, here circular shaped, that will tend to be bent or deformed upon insertion of blade 110c into the second workpiece causing ears or tabs 112c and 114c to provide a counteracting locking force or stress against the gouged-out inner wall of the second workpiece. The force acts as a locking force to hold the second workpiece onto blade 110c and consequently to hold the second workpiece fixed to the first workpiece. Circumferential fixed length F is again chosen to provide a desired combination of (i) rigidity to blade 110c for ease of insertion into the second workpiece and (ii) flexibility to blade 110c for locking blade 110c and fastener 100c to the second workpiece once inserted into same.

Fastener 100d of FIGS. 6G to 6I also includes a blade 110d that has a rolled shape, here a diamond-like shape. Blade 110d is formed with or welded to screw portion 102. Here again, less that the entire base of blade 110d is fixed to (e.g., formed with or welded to) the head of screw member 102. The circumferential fixed length F shown in FIG. 6K is less than the largest circumferential length of the bottom of blade 110d. Blade 110d forms ears or tabs 112d and 114d, here tapered-triangular shaped, that will tend to be bent or deformed upon insertion of blade 110d into the second workpiece causing ears or tabs 112d and 114d to provide a counteracting locking force or stress against the gouged-out inner wall of the second workpiece. The force acts as a locking force to hold the second workpiece onto blade 110d and consequently to hold the second workpiece fixed to the first workpiece. Circumferential fixed length F is again chosen to provide a desired combination of (i) rigidity to blade 110d for ease of insertion into the second workpiece and (ii) flexibility to blade 110d for locking blade 110d and fastener 100d to the second workpiece once inserted into same.

Any of fasteners 100a to 100d can have multiple blades and have mixed blades from different ones of fasteners 100a to 100d. Any of the blades of fasteners 100a to 100d can extend less than one-hundred eighty degrees around the head of screw portion 102, approximately one-hundred eighty degrees around the head of screw portion 102, or more than one-hundred eighty degrees around the head of screw portion 102. In one embodiment, it is contemplated for a blade to extend the entire three-hundred sixty degrees around the head of screw member 102 and have multiple sharpened points for piercing the second workpiece. Such blade could have one or more locking flaps, such as flaps 116 and 118, if desired. The blades can have other shapes from those shown in FIGS. 6A to 6L.

It should be appreciated from FIGS. 6A to 6L that the associated blades of fasteners 100a to 100d will help to hold the fasteners onto the screwdriver as the fasteners are being moved towards the first workpiece for connection thereto.

Figure 7:
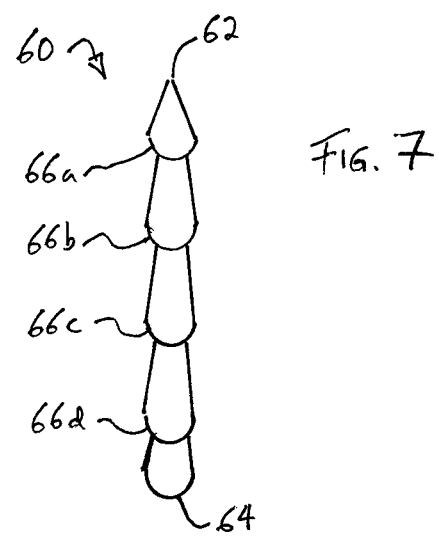
FIG. 7 is a perspective view of an alternative cylindrical saw-toothed nail that may be used with the two-way fasteners of the present disclosure.

Referring now to FIG. 7, alternative cylindrical nail 60 includes a pointed tip 62, a circular base 64 and a plurality of conically shaped saw-teeth 66a to 66d. Different amounts of saw-teeth may be provided alternatively. Cylindrical nail 60 may have a constant outer diameter as shown, or may taper outwardly as the nail extends downwardly towards base 64. Nail 60 may be used with any of the two-way nail fasteners described herein.

Referring now to FIG. 8, alternative cylindrical nail 70 includes a pointed tip 72, a circular base 74 and a standoff 76 for holding workpiece 12 a desired gap distance "d" away from workpiece 14. Standoff 76 includes a conical section 78a that angles outwardly from circular base 74 to top wall 78b. Workpiece 12 is hammered onto pointed tip 72 until the workpiece reaches top wall 78b at which point it is (i) securely fastened to nail 70 and thus workpiece 14 and (ii) held a desired gap distance "d" away from workpiece 14. The upper portion of nail 70 from top wall 78b to pointed tip 72 can have saw-teeth, such as saw-teeth 66a to 66d of nail 60 of FIG. 7, if desired to help lock workpiece 12 onto nail 70.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A two-way fastener comprising:
   a first member threaded for being screwed into a first workpiece, the first member defining a screwdriver receiving recess; and
   a second member extending from the first member in an opposite fastening direction, the second member including a blade configured to fasten to a second workpiece, the blade extending around at least a part of the screwdriver receiving recess.

2. The two-way fastener of claim 1, wherein the recess is one of a Phillips head recess and a slotted recess.

3. The two-way fastener of claim 1, wherein the second member is a nail member or a saw-tooth nail member.

4. The two-way fastener of claim 1, wherein the second member is a first second member, and which includes a second, second member extending from the first member in the opposite fastening direction.

5. The two-way fastener of claim 1, wherein the first member has a conical flathead portion at its base end, the second member extending from the flathead portion.

6. The two-way fastener of claim 5, wherein the screwdriver receiving recess is defined in a top surface of the conical flathead portion.

7. The two-way fastener of claim 1, wherein the screwdriver receiving recess is coaxial with a threaded portion of the first member, and the second member is offset from the threaded portion.

8. The two-way fastener of claim 1, wherein the blade includes a generally triangular shape extending around the at least a part of the recess.

9. The two-way fastener of claim 1, wherein the second member is configured to apply a locking force to the second workpiece after insertion into the second workpiece.

10. The two-way fastener of claim 1, wherein the blade includes locking ears or tabs for locking the second workpiece to the blade.

* * * * *